Patented Aug. 27, 1940

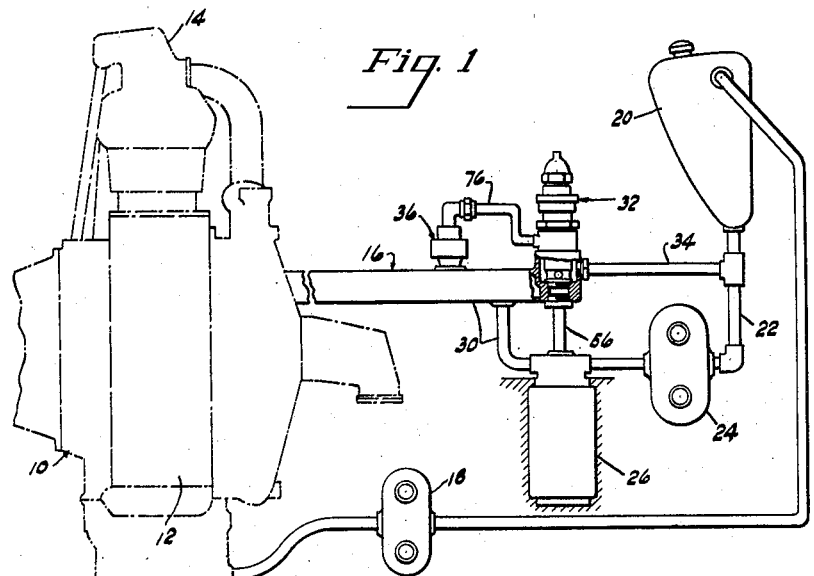
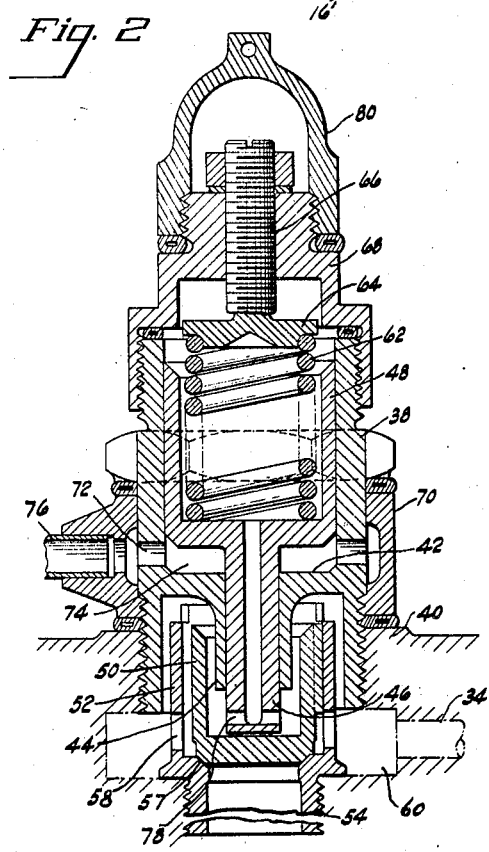
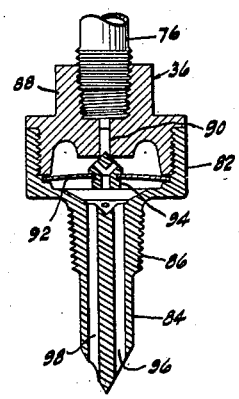

2,213,147

UNITED STATES PATENT OFFICE 2,213,147

TEMPERATURE-CONTROLLED LUBRICATING SYSTEM

Wright A. Parkins and Guy E. Beardsley, Jr., West Hartford, Conn., assignors to United Aircraft Corporation, East Hartford, Conn., a corporation of Delaware Application August 17, 1937, Serial No. 159,541

13 Claims. (Cl. 123—196)

This invention relates to improvements in engine lubricating system and has for an object the provision of an improved engine lubricating system wherein the pressure of the lubricating oil is controlled in response to the oil temperature.

A further object resides in the provision in an engine lubricating system of means for maintaining the pressure of the lubricant at an increased value whenever the temperature of the lubricant is below a predetermined value and for reducing the pressure of the lubricant when the temperature thereof is at or above a predetermined temperature.

A still further object resides in the provision in an engine lubricating system of means for quickly and positively changing the pressure of the lubricant in response to changes in the temperature thereof.

Other objects and advantages will be more particularly pointed out hereinafter or will become apparent as the description proceeds.

In the accompanying drawing in which like reference numerals are used to designate similar parts throughout, there is illustrated a suitable mechanical embodiment of what is now considered to be the preferred form of the idea of the invention. The drawing, however, is for the purpose of illustration only and is not to be taken as limiting the invention, the scope of which is to be measured entirely by the scope of the appended claims.

In the drawing Fig. 1 is a somewhat schematic elevation view of an engine lubricating system embodying a pressure control means constructed according to the idea of the invention.

Fig. 2 is a vertical sectional view of a pressure actuated pressure relief valve for controlling the pressure of the lubricating system and, Fig. 3 is a vertical sectional view of a temperature responsive valve adapted to actuate the pressure relief valve illustrated in Fig. 2.

Referring to the drawing in detail the numeral 10 generally indicates an engine, such as an internal combustion engine having a crankcase 12 supporting a plurality of cylinders, as indicated at 14, and provided with a pressure lubricating system, generally indicated at 16, for supplying lubricant under pressure to all of the working parts of the engine. While for the sake of simplicity in the illustration, the lubricating system 16 has been shown as extended from one side of the engine, it is to be understood that in the usual installation all of the elements of the lubricating system are included within the engine crankcase with the exception of the channels which lead to moving parts, reservoirs, coolers, etc., located outside of the crankcase and the means for returning the oil from such parts to the crankcase.

In the form of lubricating system illustrated by way of example in the accompanying drawing, the engine is provided with what is known as a dry sump 16' from which the lubricant draining from the working parts of the engine is pumped by a scavenging pump 18 to a suitable reservoir such as the tank 20. From the tank 20 the lubricant is led through a suitable conduit 22 to an oil pressure pump 24. From the outlet of the pump 24 the oil flows into a chamber 26 from which it is led by suitable branch conduits to the various moving parts of the engine, such a conduit being indicated by the numeral 30. A pressure relief valve, generally indicated at 32 and particularly illustrated in Fig. 2, is connected with the chamber 26 and serves to maintain a substantially constant pressure in the chamber by by-passing from the chamber the extra lubricant forced into the chamber by the pump 24 above the requirements of the engine lubricating system. The lubricant so by-passed may be led through a suitable channel, as indicated at 34, back to the reservoir 20 or to the intake of the pump 24.

As the type of lubricating system illustrated is well-known to the art and as the subject matter of the present invention is not limited in its application to any particular type of lubricating system so long as the lubricant is supplied to the system under pressure by a pump, it is believed that a more detailed description of the lubricating system is unnecessary for the purpose of this disclosure.

A temperature responsive valve, generally indicated at 36, and particularly illustrated in Fig. 3, is connected into the chamber 26 or into a channel leading from the chamber to the moving parts of the engine and acts in response to changes in the temperature of the lubricant to actuate the pressure relief valve 32 to apply different predetermined pressures to the lubricant flowing through the engine lubricating system.

The pressure relief valve 32 includes a cylindrical casing 38 screw-threaded at its lower end into a portion of the engine crankcase, as indicated at 40, adjacent to the chamber 26. This cylindrical casing is provided intermediate its length with an apertured transverse partition 42 having a downwardly extending cylindrical boss 44, through which slides the hollow stem 46 of a cup-shaped piston member 48. The lower end of the stem 46 bears against the inner surface of the closed end of a cup-shaped valve member 50 received in a cylindrical member 52 the lower end 54 of which is screw-threaded into the end of a channel 56, leading to the chamber 26 or some other portion of the lubricating system. The upper end of the member 52 is somewhat larger than the lower end portions thereof and surrounds the valve member 50. Between the two ends the member 52 is provided with a valve seat 57 with which the closed end of the valve member 50 cooperates to close off the passage through the portion 54 of the member 52. Above the valve seat 57 the member 52 is provided with a plurality of ports 58 which lead into an annular chamber 60 connected with the by-pass conduit 34. A coiled compression spring 62 is received in the cup-shaped piston 48 and bears at its upper end against a movable abutment 64 supported by a stem 66 screw-threaded into an aperture in a cap member 68 which is in turn screw-threaded upon the upper end of the cylindrical casing 38. With this arrangement the force of the spring 62 acts against the closed bottom end of the piston 48 to urge the stem 46 downwardly and the force of the spring is transmitted from the stem 46 to the closed lower end of the valve member 50 and tends to maintain the valve member seated against the valve seat 57 to restrain the lubricating fluid from flowing past the valve and into the by-pass channel 34. The lubricating fluid will flow into the by-pass channel only when the pressure exerted by the pump 24 exceeds the force of the spring 62. As the pump 24 is designed to supply an excess of lubricating fluid to the system, the pressure built up by this extra fluid will open the valve 50 and permit the extra fluid to flow into the by-pass channel. Thus the pressure of the lubricating fluid flowing into the lubricating system will be maintained constant at a value determined by the setting of the spring 62.

An internally grooved annular member 70 surrounds the casing 38 immediately above the transverse partition 42 and ports 72 lead from the groove in the annular member to the space 74 between the partition 42 and the lower surface of the closed end of the piston 48. A channel 76 leads to the interior of the annular member 70 and it will be apparent that the pressure of any fluid flowing through the channel 76 and the port 72 will be applied against the undersurface of the closed end of the piston 48 to thereby increase the area upon which the oil pressure acts in opposition to the spring 62, or in effect to reduce the force exerted by the spring 62 thereby decreasing the pressure maintained by the spring on the lubricating fluid in the engine lubricating system. The relation between the original pressure and the reduced pressure can obviously be controlled by providing proper effective areas for the valve member 50 and piston 48. The bore of the hollow stem 46 is connected by the transverse port 78 with the pressure existing in the annular chamber 60 and extends into the interior of the cup-shaped piston 48 to vent the space between the piston and the cap member 68 so that movement of the piston will not be affected by the compression of fluid in the space between the piston and the cap member. A cover member 80 encloses the projecting end of the stem 66 and is screw-threaded onto the upper end of the cap member 68 and serves to prevent leakage of lubricating fluid from the system around the stem 66.

The temperature responsive valve 36 includes a base portion 82 having a stem 84 adapted to be screw-threaded into the engine crank-case by the screw-thread 86 in such a position that the stem will project downwardly into an oil channel leading from the chamber 26 or into the chamber itself. The stem 84 is surmounted by an integral cup-shaped portion internally screw-threaded to receive a plug member 88 provided with a concentric aperture 90 and a screw-threaded well to receive the screw-threaded end of the channel 76. A bi-metallic thermostatic element 92 in the form of a spherically curved disk is clamped at its edges between the cylindrical upper end of the member 82 and the lower end of the plug member 88 and is provided with a central aperture within which is inserted an apertured valve member 94 provided with channels leading from one side of the disk 92 to the other, and with a substantially conical tip which closes the adjacent end of the aperture 90 when the valve member is held in its uppermost position by the thermostatic disk 92 as illustrated in Fig. 3. The stem 94 is provided with a plurality of channels, as indicated at 96 and 98 somewhat spaced apart and positioned along the direction of flow of lubricating fluid in the channel into which the plug is threaded so that the flow of fluid through the channel will cause some of the fluid to flow upwardly through some of the channels into the space immediately below the valve disk 92 and out of this space through other channels. This arrangement constantly brings the lubricating fluid in the lubricating system in contact with the thermostatic element 92 and renders the element responsive to changes in the temperature of the fluid. The position of the thermostatic element for cold fluid is illustrated in Fig. 3 in which the valve is closed. As the fluid warms up and reaches a predetermined temperature, the thermostatic element 92 will spring downwardly moving the member 94 to open the channel through the aperture 90. When this occurs, the pressure of the fluid in the channel into which the plug 84 is inserted will cause fluid to flow through the channel 96 and 98 and the apertured valve plug 94 and the aperture 90 into the channel 76. Fluid flowing through the channel 76 enters the space 74 of the pressure relief valve and exerts an upward pressure on the piston 48 to reduce the force exerted by the spring 62 of the valve member 50 thereby reducing the pressure maintained by the pressure relief valve on the fluid in the lubricating system.

Thus with the arrangement described, when the oil is cold, a high pressure will be maintained upon the lubricating fluid in the engine lubricating system to insure an adequate amount of lubricating fluid in its cold and viscous condition, to all of the working parts of the engine. As soon as the fluid has warmed up to a point at which its viscosity is reduced and it flows readily through the lubricating system, the pressure is immediately reduced to avoid the disadvantages of supplying too great a quantity of lubricant to the engine at too high a pressure.

While a particular form of temperature responsive valve has been illustrated and described, it is to be understood that the invention is in no way limited to the particular form shown by way of example. Various other forms of thermostats other than snap disk thermostats could be used to render the valve responsive to the temperature of the lubricant and the valve itself may take various forms depending upon the form of the thermostat used to control it. Furthermore, the thermostat itself may be placed directly in the lubricant channel so that it will be more completely surrounded by the lubricant and the entire valve may be located either adjacent to the pressure relief valve 32 or at some other selected point in the engine lubricating system.

While there has been illustrated and described a particular mechanical embodiment of the idea of the invention, it is to be understood that the invention is in no way limited to the particular construction so illustrated and described but that such changes in the size, shape and arrangement of parts may be resorted to as come within the scope of the subjoined claims.

Having now described the invention so that others skilled in the art may clearly understand the same what it is desired to secure by Letters Patent is as follows:

1. In a fluid pressure system having a source of fluid pressure for supplying fluid under pressure to all parts of said system, a pressure relief valve actuated by the fluid pressure at some selected point in said system for maintaining the fluid pressure in said system constant at a predetermined value, and means for controlling said valve according to the temperature of the fluid in said system to maintain the fluid in said system at a higher pressure when the temperature of said fluid is below a predetermined value than when said temperature is above said predetermined value.

2. In a fluid pressure system having a source of fluid pressure for supplying fluid under pressure to all parts of said system, a pressure relief valve for maintaining the fluid pressure in said system constant at one preselected value when the fluid temperature is below a predetermined value, and for maintaining the fluid pressure in said system at a different preselected value when the fluid temperature is above said predetermined value, and temperature responsive means for controlling said pressure relief valve in accordance with the temperature of the fluid.

3. In a fluid pressure system having a pump for supplying fluid under pressure to said system, said pump having a capacity in excess of the pressure requirement of said system, a by-pass for said pump, pressure regulating means including a pressure relief valve for controlling said by-pass, to limit the fluid pressure in said system, and a thermostatically controlled valve responsive to the temperature of the fluid in said system for changing the pressure limit maintained by said pressure regulating means.

4. In a pressure lubrication system for an engine, a pump for supplying oil under pressure to all parts of said lubrication system the capacity of said pump being in excess of the lubrication requirements of said engine, a by-pass for said pump, a pressure relief valve for controlling said by-pass to maintain a selected fluid pressure in said system, and means responsive to the temperature of the lubricant for controlling said valve whereby said valve will maintain in said system a relatively high fluid pressure when the viscosity of said oil is high incident to a low temperature thereof and a relatively low pressure when the viscosity of said oil is low incident to a high temperature.

5. In a pressure lubrication system for an engine, a pump for supplying oil under pressure to all parts of said system, the capacity of said pump being in excess of the lubrication requirements of said engine, a by-pass for said pump, a pressure relief valve for controlling said by-pass to maintain a selected fluid pressure in said system, and a thermostatically controlled valve responsive to the temperature of the lubricant in said system for controlling said pressure relief valve to maintain in said system a fluid pressure sufficient to overcome the increased resistance to flow due to the viscosity of said lubricant.

6. In a pressure lubrication system for an internal combustion engine, a pump for supplying oil under pressure to all parts of said system, the capacity of said pump being in excess of the lubrication requirement of said engine, a by-pass for said pump, a pressure relief valve for controlling said by-pass to maintain a selected fluid pressure in said system, said valve having a closure member spring urged toward its closed position and urged toward its open position by fluid pressure against the face of said closure member, a piston in said valve, and a thermostatically controlled valve in said system for applying the pressure of the lubricant in said system after said lubricant has reached a predetermined temperature to said piston to reduce the force exerted by said spring on said closure member.

7. In an engine lubrication system, means for applying pressure to the lubricant in said system, pressure responsive means for regulating said pressure capable of maintaining said pressure constant at any one of a plurality of preselected pressure values, and means responsive to the temperature of said lubricant for controlling said pressure responsive means to automatically select the pressure value in accordance with the incident temperature of the lubricant.

8. In an engine lubricating system, means for applying pressure to the lubricant in said system, pressure responsive means for regulating the pressure of said lubricant, and temperature responsive means for controlling the pressure actuating said pressure responsive means.

9. In a system for circulating fluid under pressure in combination, a relief valve for maintaining the pressure substantially constant in said system, fluid actuated means associated with said valve for changing the pressure maintained by said relief valve, a valve controlling the fluid fed to said fluid actuated means and temperature actuated means for operating said last mentioned valve to determine the pressure maintained by said relief valve.

10. In a fluid pressure system having a source of fluid pressure, in combination, a pressure relief valve for maintaining a selected fluid pressure in said system, fluid pressure actuated means for regulating said relief valve to select the fluid pressure to be maintained in said system and a snap acting, thermostatically actuated element for controlling said means by regulating the application of fluid pressure thereto.

11. In a system for circulating fluid under pressure in combination, a relief valve for maintaining the pressure substantially constant in said system, fluid actuated means associated with said valve for reducing the pressure maintained by said relief valve, another valve controlling the fluid fed to said fluid actuated means and a snap acting element actuated by an increase in the temperature of the fluid circulating in said system to open said another valve to admit fluid to said fluid actuated means and reduce the pressure maintained by said relief valve.

12. In an engine lubricating system, means for applying pressure to the lubricant in said system, and means for regulating said pressure comprising, a relief valve having means for maintaining said pressure constant at either one of two preselected values, and means disposed between said pressure applying means and said relief valve actuated by the temperature of said lubricant for controlling said relief valve to automatically select the pressure imposed on said lubricant by said relief valve in accordance with the incident temperature of the lubricant.

13. In a pressure lubrication system for an engine, a pump for supplying oil under pressure to said system, the capacity of said pump being in excess of the lubrication requirements of said engine, a by-pass for said pump, pressure relief means for controlling said by-pass to limit the fluid pressure in said system to not exceed a selected maximum value, and a thermostatically controlled valve responsive to the temperature of the lubricant in said system for controlling said pressure relief means to select a different maximum value for the fluid pressure in said system sufficient to overcome the increased resistance to flow due to the viscosity of said lubricant whenever the temperature of said lubricant is below a predetermined value.

WRIGHT A. PARKINS.
GUY E. BEARDSLEY, Jr.